United States Patent [19]
McKay et al.

[11] Patent Number: 5,265,478
[45] Date of Patent: Nov. 30, 1993

[54] FLUID FLOW MONITORING DEVICE

[76] Inventors: Mark D. McKay, 1426 Socastee Dr., North Augusta, S.C. 29841; Chad E. Sweeney, 3600 Westhampton Dr., Martinez, Ga. 30907-3036; B. Samuel Spangler, Jr., 2715 Margate Dr., Augusta, Ga.

[21] Appl. No.: 664,717

[22] Filed: Mar. 5, 1991

[51] Int. Cl.$^5$ .............................................. G01F 1/44
[52] U.S. Cl. ................................. 73/861.63; 376/246
[58] Field of Search ........... 73/861.61, 861.62, 861.63, 73/861.64, 861.65; 376/246

[56] References Cited

U.S. PATENT DOCUMENTS

| | | | |
|---|---|---|---|
| 1,126,275 | 1/1915 | Rice | 73/861.64 |
| 1,143,631 | 6/1915 | Keller et al. | 73/861.63 |
| 1,266,428 | 5/1918 | Dodge | 73/861.64 |
| 1,829,703 | 10/1931 | Larner | 73/861.63 |
| 2,042,933 | 6/1936 | Forward | 73/861.63 X |
| 2,197,214 | 4/1940 | Hollander | 73/213 |
| 2,240,119 | 4/1941 | Montgomery et al. | 73/207 |
| 2,760,371 | 8/1956 | Borden | 73/861.63 |
| 3,896,670 | 7/1975 | Converse, III et al. | 73/213 |
| 3,993,539 | 11/1976 | Altherton et al. | 73/861.63 X |
| 4,434,668 | 3/1984 | Shinoda et al. | 73/861.22 |
| 4,644,800 | 2/1987 | Kozlak | 73/861.64 |
| 4,799,388 | 1/1989 | Hunter | 73/861.63 |
| 5,099,686 | 3/1992 | Kohler | 73/861.65 X |

Primary Examiner—Herbert Goldstein
Attorney, Agent, or Firm—Brian R. Tumm; Harold M. Dixon; William R. Moser

[57] ABSTRACT

A flow meter and temperature measuring device comprising a tube with a body centered therein for restricting flow and a sleeve at the upper end of the tube to carry several channels formed longitudinally in the sleeve to the appropriate axial location where they penetrate the tube to allow pressure measurements and temperature measurements with thermocouples. The high pressure measurement is made using a channel penetrating the tube away from the body and the low pressure measurement is made at a location at the widest part of the body. An end plug seals the end of the device and holes at its upper end allow fluid to pass from the interior of the tube into a plenum. The channels are made by cutting grooves in the sleeve, the grooves widened at the surface of the sleeve and then a strip of sleeve material is welded to the grooves closing the channels. Preferably the sleeve is packed with powdered graphite before cutting the grooves and welding the strips.

13 Claims, 2 Drawing Sheets

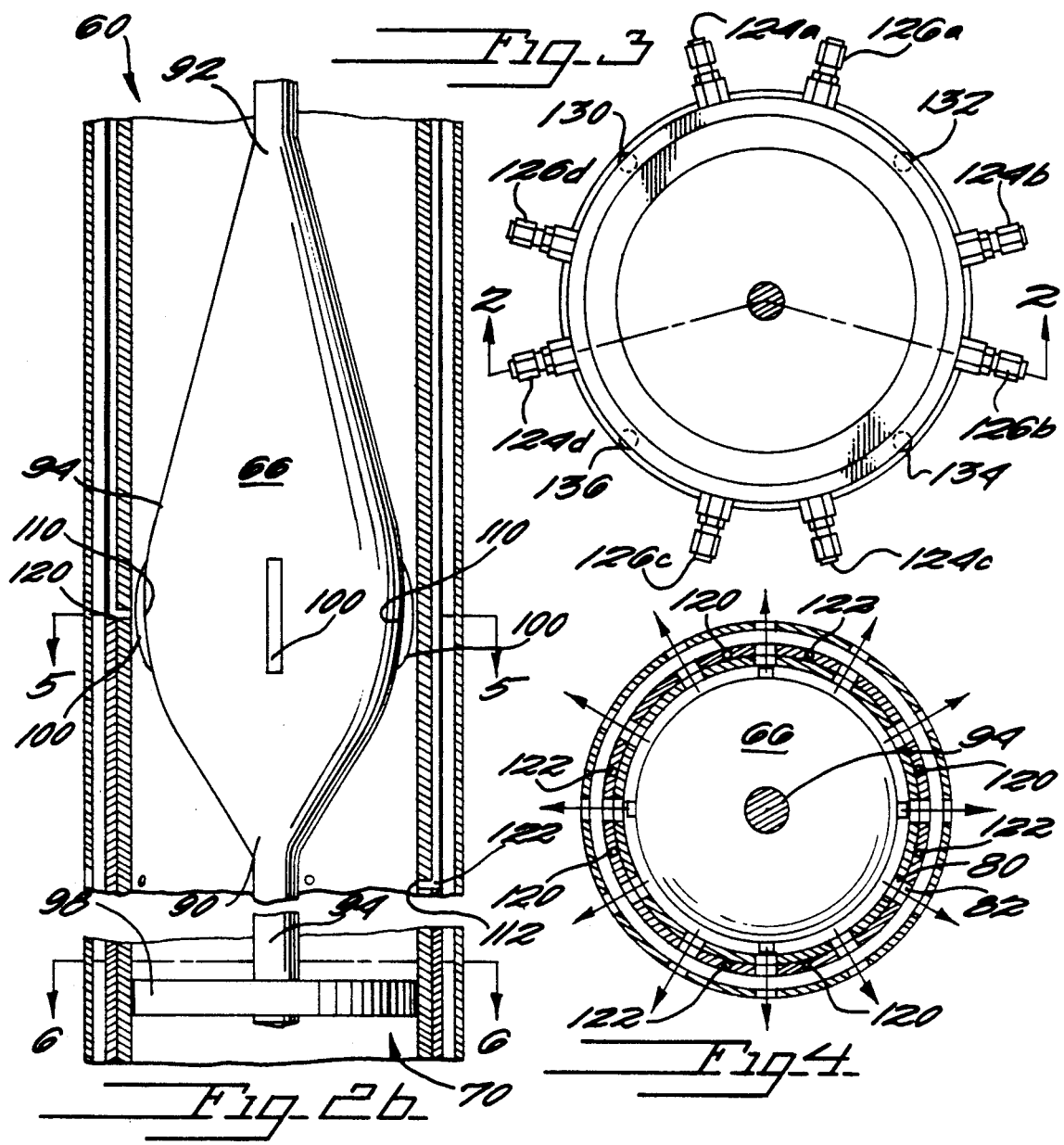

FLUID FLOW MONITORING DEVICE

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to fluid monitoring devices. More specifically, the present invention relates to devices for monitoring the temperature and flow rate of a flowing fluid.

2. Discussion of Background

A number of devices exist to measure fluid flow rates. Some of these are venturi tubes, tubes that have a narrowed or restricted portion where the flow increases in accordance with Bernoulli's Law and where the pressure can be compared to that at the unrestricted portions of the tubes. Some devices have so-called venturi center bodies. A venturi center body is a device in a tube that, by blocking part of the tube, reduces or constricts the flow area and thus creates a pressure drop much as with the usual venturi tube.

As examples of venturi center bodies, see the devices disclosed in U.S. Pat. Nos. 4,644,800 issued to Kozlak, 1,829,703 issued to Larner and 1,126,275 issued to Rice. The Kozlak device also includes a thermocouple for measuring the temperature of the fluid in addition to the flow rate.

In nuclear reactors, the flow rate and temperature of the reactor coolant are important physical parameters. Flow rates and temperatures are related to efficiency and nuclear safety. It is therefore important to monitor the flow rate and temperature of each coolant passage in a reactor core. Since dimensions and tolerances within a nuclear reactor are crucial, flow rate and temperature monitoring devices must be compact and efficiently designed. Also, since the environment of use in a reactor is fairly hostile, characterized by high temperatures and high radioactivity levels, the flow meters must be both rugged and easily replaceable.

There is thus a need for devices that accurately and continuously measure flow rates and temperatures in coolant channels in nuclear reactors and are designed for that specific environment and conditions of use.

SUMMARY OF THE INVENTION

According to its major aspects, the present invention is a device for measuring the flow rate and, preferably, also the temperature of a fluid. The device comprises a tube or conduit defined by a wall with an inlet and an exit, a structure or body positioned within the tube that reduces the cross sectional area of flow along the portion of the tube occupied by the body, and means for anchoring and centering the body within the tube so that its position does not change during operation. The tube has a sleeve surrounding a portion of its length with channels formed longitudinally therein and turning to penetrate into the tube at the desired axial location which channels allow communication between the interior and exterior of the tube.

The channels are formed in pairs with one pair penetrating the tube near the body, where the pressure is lower, and one penetrating away from the body, where the pressure is higher, so that the pressure differential can be used to determine or calculate the flow rate. Additional longitudinal channels are used to accommodate the introduction of thermocouples to measure the temperature of the fluid flowing in the tube.

The body has two ends, one toward the inlet and one toward the exit, both of which are tapered. The body may optionally have fins to stabilize it in the tube.

The center body is a feature of the present invention. In a preferred embodiment, the profile of the body is optimized to produce the minimum frictional loss, or "head" loss from one end to the other by tapering the first or inlet-pointing end and the second or exit-pointing end. Generally, the first end is tapered more sharply and the second end is tapered more gradually. The advantage of this feature is the reduction of the impact of friction caused by the center body on flow, the quantity being measured.

The center body is also axially adjustable; in fact, it is removable if desired. The body is, however, secured against radial movement by a wheel attached to the inlet end of the body. In an alternative embodiment, a second wheel may be provided at the opposite, or exit, end of the body to add additional radial stability. Further, stabilizing fins may be added to the center of the body itself. The advantage of these features is greater stability for more accurate and repeatable measurements and yet flexibility whenever the body needs to be removed or its axial position needs to be adjusted with respect to the high and low pressure taps.

Another feature of the present invention is the orientation of the channels to provide access to the interior of the tube so that pressure drop information can be obtained. The channels, in the preferred embodiment begin at the exit end of the device and continue longitudinally inside the sleeve to the appropriate position axially. The channels are arranged in pairs, one channel of each pair penetrating the tube near the body and one penetrating away from the body so that two different pressure measurements can be made, a low pressure measurement at the penetration near the body and a high pressure measurement at the penetration away from the body. From the difference in pressures, a pressure drop can be derived and the flow rate determined or calculated knowing the geometry of the body producing the drop. The advantage of this feature is compactness of design. The tube and sleeve fit neatly into small, circular penetrations in the top of the reactor core. Connections can be made to the channels at the top of the device, with no interference with the flow through the tube or adjacent coolant channels.

Another feature of the present invention is that the same orientation of channels, longitudinal through the sleeve, accommodates the thermocouples as well as the pressure taps. This feature also simplifies manufacturing and achieves a more compact design.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 2b is a partial, front, cross-sectional view of the bottom of the monitoring device shown in FIG. 2a;

FIG. 3 is a top view of the device;

FIG. 4 is a cross-sectional view of the device shown in FIG. 2a taken along lines 4—4;

FIG. 5 is a cross-sectional view of the device shown in FIG. 2b taken along lines 5—5; and FIG. 6 is a cross sectional view of the device shown in FIG. 2b taken along lines 6—6.

DETAILED DESCRIPTION OF A PREFERRED EMBODIMENT

Figure 1:
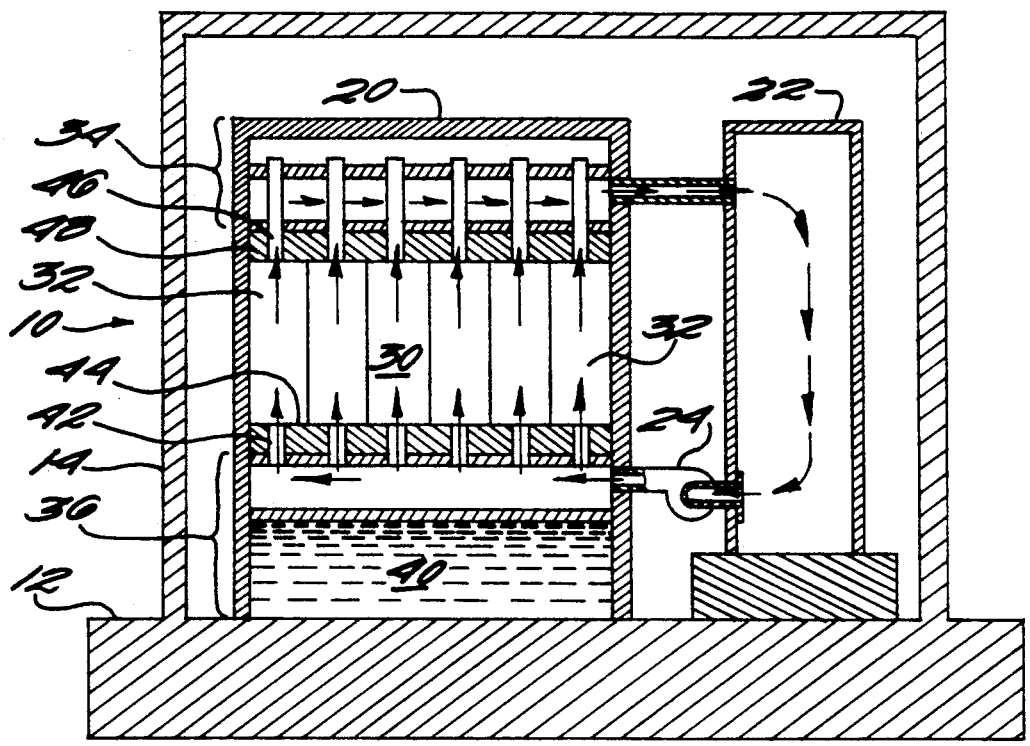
FIG. 1 is a cross section of a reactor showing fluid flowing through the reactor core with monitoring devices in accordance with a preferred embodiment of the present invention.

Referring now to FIG. 1, there is illustrated a generalized nuclear reactor 10 having a foundation 12 and a containment 14. Inside containment 14 is a reactor vessel 20 and a heat exchanger 22. Coolant flows, as indicated by the arrows between heat exchanger 22 and reactor vessel 20, circulated by a pump 24.

Inside reactor vessel 20 is a nuclear core 30 composed of fuel elements 32 between an upper plenum region 34 and a lower plenum region 36. A well 40 containing additional coolant is located at the bottom of lower plenum region 36. The coolant in reactor 10 flows from lower plenum region 36 through holes 42 in a lower shield 44, through fuel elements 32 to holes 46 in upper shield 48 before entering upper plenum region 34.

Figure 2A:
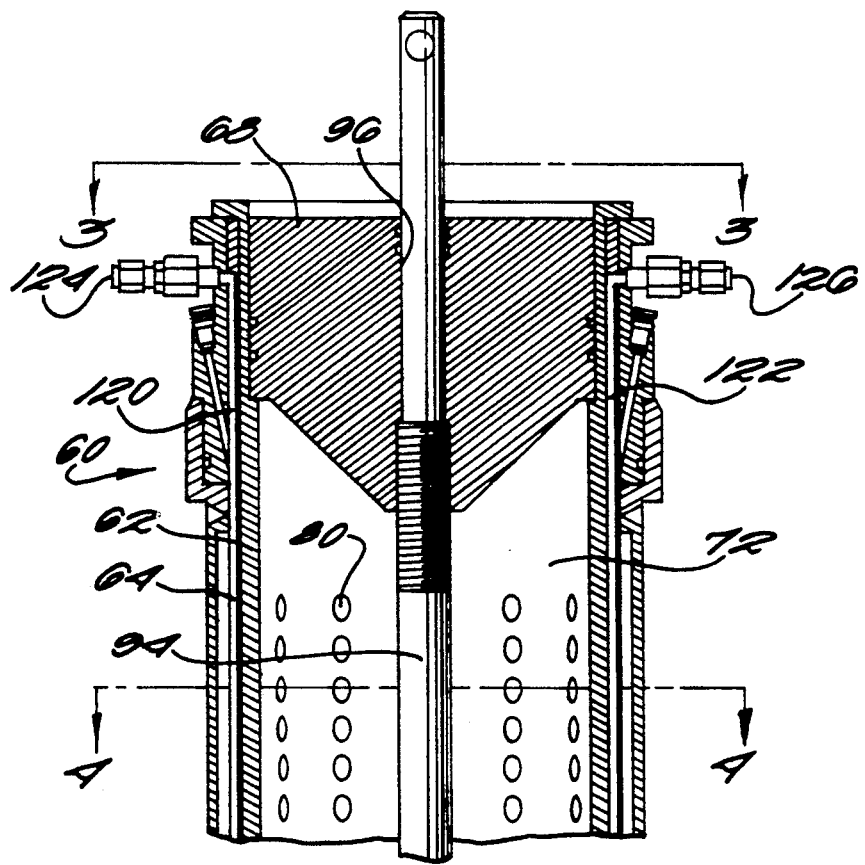
FIG. 2a is a partial, front, cross-sectional view of the top of the monitoring device according to a preferred embodiment of the present invention taken along line 2—2 of FIG. 3.

In upper plenum region 34 is located the instrumentation of the present invention, namely a device 60 (FIGS. 2a, 2b, 3-6) for measuring the flow rates and temperatures of the coolant that has flowed through each fuel element. Device 60 is shown in detail in FIGS. 2a and 2b, with cross sections at intervals of the embodiment shown in FIGS. 4, 5 and 6. FIG. 3 shows device 60 from the top and indicates FIGS. 2a and 2b are cross sections taken along line 2—2.

Device 60 comprises a tube 62 or conduit surrounded by a sleeve 64 and having a body 66 centered within tube 62. Sleeve 64 extends along a portion of tube 62. At the top of tube 62 is an endplug 68. Tube 62 has an inlet end at 70 and an exit end at 72. Fluid flows upward from inlet end 70 to exit end 72, exiting device 60 through apertures in tube 62 and sleeve 64. Specifically, the upper portion of tube 62 has a plurality of holes 80 through which the fluid can pass, and sleeve 64 has holes 82 (best seen in FIG. 4) aligned with holes 80 through which the fluid can pass into the plenum chamber.

Body 66 has a first end 90 toward inlet end 70 of tube 62 and a second end 92 toward exit end 72. The surface 94 of body 66 is tapered at both first and second ends 90, 92. The taper at first end 90 is sharper, or less gradual, than that at second end 92. In a preferred embodiment, the taper is optimized, that is, it is adjusted given the size of tube 62 and body 66 so that frictional loss, or "head loss" from first end 90 to second end 92 is minimized.

Body 66 is centered on a mast 94 that extends upward to endplug 68 where it is threaded through a threaded hole 96 therein, and downward to a wheel 98 that prevents radial movement of body 66 as fluid flows around it. Body 66 is therefore axially adjustable by turning it about its axis causing it to advance in threaded hole 96. For added stability, fins 100 (FIG. 2b) are provided to maintain a centering of body 66. Also, and optionally, a second wheel (not shown) can be provided above body 66.

Body 66 creates a drop in the pressure of fluid from that which would otherwise exist in tube 62 without body 66. The pressure at the widest part 110 of body 66 is lowest and that away from body 66, such as at 112 is higher. The difference in pressure equals the pressure drop. From the geometry of body 66 and tube 62, the flow rate of the fluid can be related mathematically to this pressure drop.

To measure the pressure in tube 62, a number of taps or channels are formed longitudinally in sleeve 64 which turn and penetrate tube 62 at the appropriate axial location along tube 62. These channels are arranged in pairs, one pair shown in FIGS. 2a and 2b and four pair are shown in FIGS. 3 and 4. In FIGS. 2a and 2b, one channel 120 is a low pressure tap and another channel 122 is a high pressure tap. Channel 120 turns and penetrates tube 62 at 110, at the widest part of the centerbody 66 (see FIG. 5); channel 122 turns and penetrates tube 66 at 112 just prior to first end 90. Pressure gauges (not shown) can be attached to one end of channels 120, 122 at exit end 70 near endplug 68 via fittings 124a-d, 126a-d.

Channels 120 and 122 can be formed by cutting longitudinal grooves in sleeve 64, preferably widening the groove at the exterior surface of sleeve 64, then welding strips of material of the same type as the sleeve material at the widened part of the sleeve. Preferably, sleeve 64 is first packed with a removable material, such as a material like powdered graphite that also transfers heat readily, to provide support for the cutting and welding operations. Also, preferably, the welded zone is stress relieved both before and after the welding.

Additional channels are prepared for at least one thermocouple. In FIGS. 3 and 4 four thermocouples 130, 132, 134, and 136 with four corresponding thermocouple channels 140 in sleeve 64. Preferably, thermocouple channels 140 (FIG. 2a) penetrate tube 62 at holes 80 to measure the temperature of the exiting fluid.

FIG. 3 also shows high and low pressure tap fittings 124a-d and 126a-d, respectively, and thermocouples 130, 132, 134, and 136.

FIG. 6 shows wheel 98 from the top. Wheel 98 has several spokes 150 to provide support for mast 94 but not to interfere with the flow of fluid to any appreciable extent.

In operation, fluid flows from inlet end 70 to exit end 72 of tube 62, flowing around body 66. The first pressure measurement is made just prior to 66 at 112. The second measurement is made at the widest part of the centerbody 66. The two pressure measurements are compared to determine the pressure drop and then mathematical relationships are used to determine the fluid flow. The temperature of the fluid is measured by thermocouples 130 at holes 80 as the fluid exits device 60 to plenum chamber 34 (FIG. 1). Body 66, centered within tube 62 and positioned axially by turning it in threaded hole 96 so that the widest part of body 66 is located axially at 110, is stabilized by wheel 98 against radial movement and by fins 100.

It will be apparent to those skilled in the art that many changes and substitutions can be made to the preferred embodiment herein described without departing from the spirit and scope of the present invention which is defined by the appended claims.

What is claimed is:

1. A device for measuring the flow rate of a fluid, said device comprising:

a wall defining an enclosed conduit, said conduit having an inlet end and an exit end;

means formed in said conduit for decreasing the cross sectional area of said conduit through a portion of the length of said conduit;

means for anchoring said decreasing means to said wall; and at least one pair of channels formed longitudinally within said wall, said at least one pair of channels running from said exit end of said conduit towards said entrance end and communicating with the interior of said conduit for measuring pressure in said conduit, a first channel of said at least one pair of channels penetrating through said conduit near said decreasing means and a second channel of said pair of channels penetrating said conduit away from said decreasing means, pressure in said first channel dropping more than pressure in said second channel when fluid flows through said conduit so that a pressure drop across said decreasing means can be measured and said flow rate of said fluid determined from said pressure drop.

2. The device as recited in claim 1, wherein said decreasing means is a body positioned within said conduit.

3. The device as recited in claim 2, wherein said body has a first end and a second end and both said first and said second ends are tapered.

4. The device as recited in claim 1, wherein said decreasing means is a body positioned within said conduit and said anchoring means centers said body in said conduit.

5. The device as recited in claim 4, wherein said body has a first end and a second end and both said first and said second ends are tapered.

6. The device as recited in claim 2, wherein said body has a plurality of fins.

7. A device for measuring the flow rate and temperature of a fluid, said device comprising:

a tube having a wall, an inlet end and an exit end;

a monitoring sleeve fitted around a portion of said wall of said tube, said monitoring sleeve having at least one first channel and at least one second channel formed longitudinally therein, said at least one first and at least one second channels penetrating said wall to communicate with the interior of said tube; and a body mounted interior to said tube, said body having a first end and a second end, and both said first and said second ends of said body being tapered, said body creating a pressure drop within said interior, said at least one first channel penetrating said wall near said body and said at least one second channel penetrating said wall away from said body so that said pressure drop between said at least one first and at least one second channels can be measured and said flow rate of said fluid determined from said pressure drop.

8. The device as recited in claim 7, further comprising means for measuring the temperature of said fluid flowing within said tube, said measuring means carried by said sleeve.

9. The device as recited in claim 7, further comprising means for anchoring said body to the inside of said wall.

10. The device as recited in claim 9, wherein said body has a plurality of fins.

11. The device as recited in claim 7, further comprising means for adjusting the axial location of said body within said tube.

12. The device as recited in claim 7, further comprising:

means for slidably centering said body within said tube; and means for adjusting the axial location of said body within said tube.

13. The device as recited in claim 7, wherein said body has a plurality of fins.

* * * * *